United States Patent

Kanamaru

[15] 3,660,615

[45] May 2, 1972

[54] TAPE LOOP FORMING MECHANISM FOR USE WITH A TAPE RECORD/PLAYBACK MECHANISM

[72] Inventor: Yuuichi Kanamaru, Saitama-ken, Japan

[73] Assignee: Sony Corporation, Tokyo, Japan

[22] Filed: Aug. 6, 1970

[21] Appl. No.: 61,618

[30] Foreign Application Priority Data

Jan. 24, 1970 Japan....................................45/6484

[52] U.S. Cl............179/100.2 T, 179/100.2 R, 179/100.2 Z, 226/200

[51] Int. Cl................G11b 15/60, G11b 15/66, B65h 23/26

[58] Field of Search.............179/100.2 T, 100.2 Z, 100.2 R; 274/4; 226/200

[56] References Cited

OTHER PUBLICATIONS

Automatic Tape Threading, R. Johnson et al., p. 968 Vol. 9, Jan. 1967 IBM Tech. Disc.

*Primary Examiner*—Bernard Konick
*Assistant Examiner*—Jay P. Lucas
*Attorney*—Lewis H. Eslinger, Alvin Sinderbrand and Curtis, Morris & Safford

[57] ABSTRACT

A ratchet mechanism is used to separate rotatable and longitudinally movable tape guiding fingers in a video tape recorder. The fingers withdraw the magnetic tape from a tape cassette, form it into a loop and place it around a rotating drum having magnetic tape heads therein.

10 Claims, 5 Drawing Figures

INVENTOR.

YUUICHI KANAMARU

INVENTOR.

YUUICHI KANAMARU

INVENTOR.

YUUICHI KANAMARU

TAPE LOOP FORMING MECHANISM FOR USE WITH A TAPE RECORD/PLAYBACK MECHANISM

In order to prepare a tape recorder for playing material on a magnetic tape or for recording material upon a tape, the tape had to be threaded through a pre-determined path in the recorder which generally extended from a supply reel, past tape heads and then returned to a take-up reel.

This operation was time consuming and required a degree of manual dexterity on the part of the user. Since it also involved handling the tape with one's fingers, the tape was subject to picking up foreign matter and the fidelity could be reduced.

Various ways were suggested to automatically thread the tape through the chassis of a tape recorder, however, these methods proved to be expensive and the devices incorporating these methods were difficult to operate.

Briefly, the present invention is concerned with providing a plurality of tape guiding fingers which automatically withdraw the tape from a cassette, form the tape into a loop and place it around a drum having rotating magnetic heads therein. The tape guiding fingers are properly spaced from each other by a control member in the form of a ratchet and pawl. The tape guiding fingers are eccentrically mounted on a plate whereby rotation of the plate produces longitudinal movement of the fingers and by using a series of upstanding lugs, the restraining force of the ratchet is overcome when the previous finger has left the ratchet thereby maintaining a spaced relationship between the fingers.

It is therefore a principal object of the invention to provide a mechanism for properly maintaining a spaced relationship between tape guiding fingers.

It is a further object of the invention to mount a plurality of tape guiding fingers eccentrically on a plate whereby longitudinal as well as rotational movement can be imparted to the tape guiding fingers.

It is another object of the invention to provide a ratchet and pawl mechanism to maintain tape guiding fingers in proper spaced relationship.

It is yet another object of the invention to provide a lug on a tape guiding finger which provides an abutment member to assist in overcoming the restraining force of the ratchet and pawl at the proper pre-determined time.

It is still a further object of the invention to provide a mechanism for maintaining tape guiding fingers properly spaced which is compact, inexpensive to manufacture, has few moving parts and is simple to assemble.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

For the purpose of illustrating the present invention, a specific type of tape guiding mechanism is disclosed. It should be understood, however, that the aspects of the present invention are applicable to other various types of tape guiding members and it is not intended to limit the present invention to the specific type of tape guide mechanism described and shown.

Figure 5:
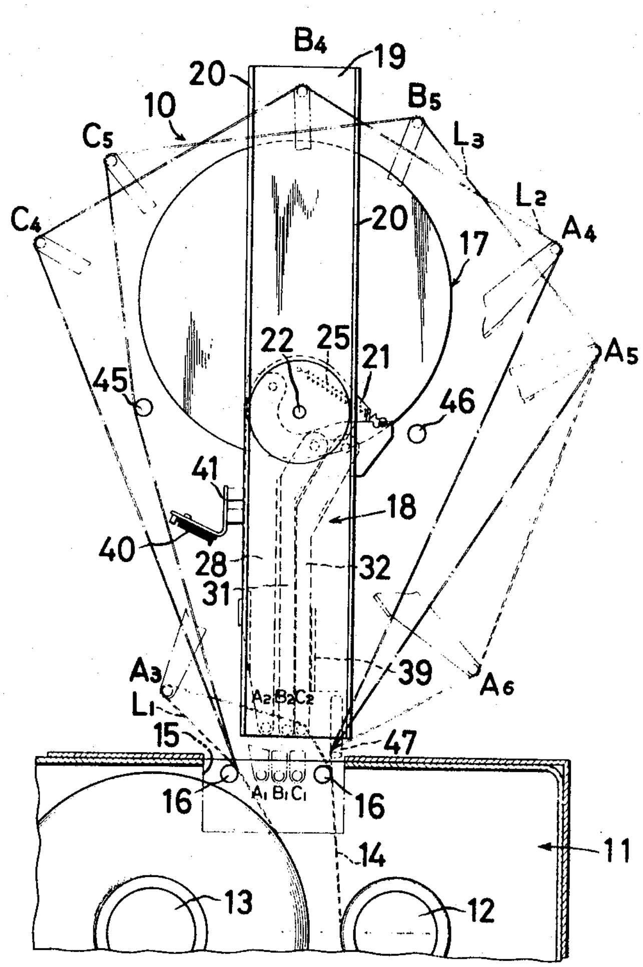
FIG. 5 is a top view showing the basic arrangement of the fingers and their relationship to a tape recording head in a video tape recorder.

Referring now to the drawings, specifically FIG. 5, there is shown a portion of a video tape recorder chassis 10. The chassis has mounted thereon a cassette 11 which is well known in the art. The cassette houses a take-up reel 12 and a supply reel 13 which are rotatably mounted and have a magnetic tape 14 wound thereon and extending therebetween. The cassette 11 has an opening 15 therein through which the tape 14 can be drawn and a pair of upright guide posts 16 guide the tape 14 for withdrawal from the opening 15.

A tape guide drum 17 is formed in two parts (not shown) whereby it has upper and lower sections and a magnetic head or a plurality of heads are secured to either the upper or lower moiety of the drum 17. The magnetic heads can apply or pick up a signal to or from the magnetic tape for recording or listening purposes. The drum is rotatably mounted on the chassis 10 and can be motor driven or otherwise suitably rotated.

Figure 1:
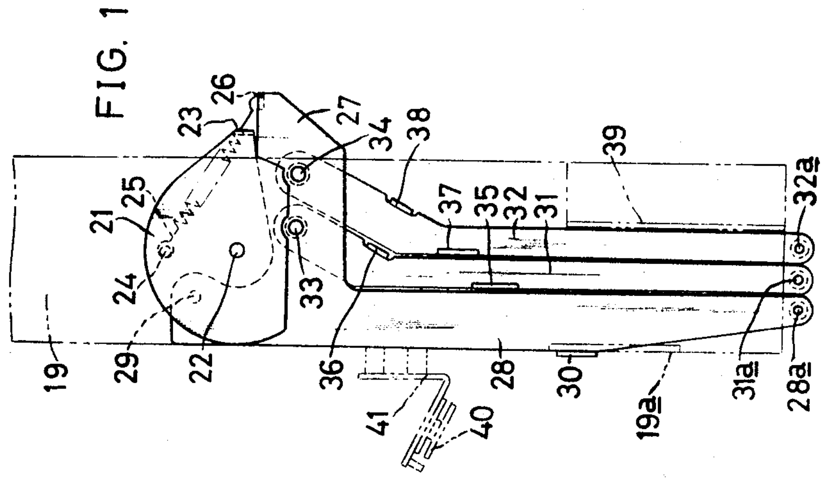
FIG. 1 is a top view showing the tape guiding fingers in rest position and showing a loading plate and ratchet in phantom lines.

The tape guiding fingers 18 are rotatably attached to a loading plate 19 having upstanding flanges 20 thereon so as to form a channel. In FIG. 1 there is depicted a plate 21 which is secured to a rotatable shaft 22 mounted for rotation upon the loading plate 19. The plate 21 has an upstanding tab 23 affixed thereto and extending at approximately a right angle to said plate. An upstanding post 24 is also secured to the plate 21 preferably extending away from the plate in the same direction as the lug 23. A spring 25 has one end fixed to the post 24 and the other end fixed to a tab 26 on the leg 27 which forms one leg of an "L"-shaped extension on the tape guiding finger 28. The finger 28 is pivotally secured by a pin 29 to the plate 21 such that the spring 25 biases the finger in a counter-clockwise direction as viewed in FIG. 1 about the pin 29. The rotation of the arm 28 is stopped by the tab 23 on the plate 21 abutting against the leg 27 on the finger 28. The finger 28 has a depending lug 30 thereon which abuts against a depending stop 19*a* on the loading plate 19 which maintains the finger in longitudinal axial alignment with the plate 19.

Figures 3, 4:
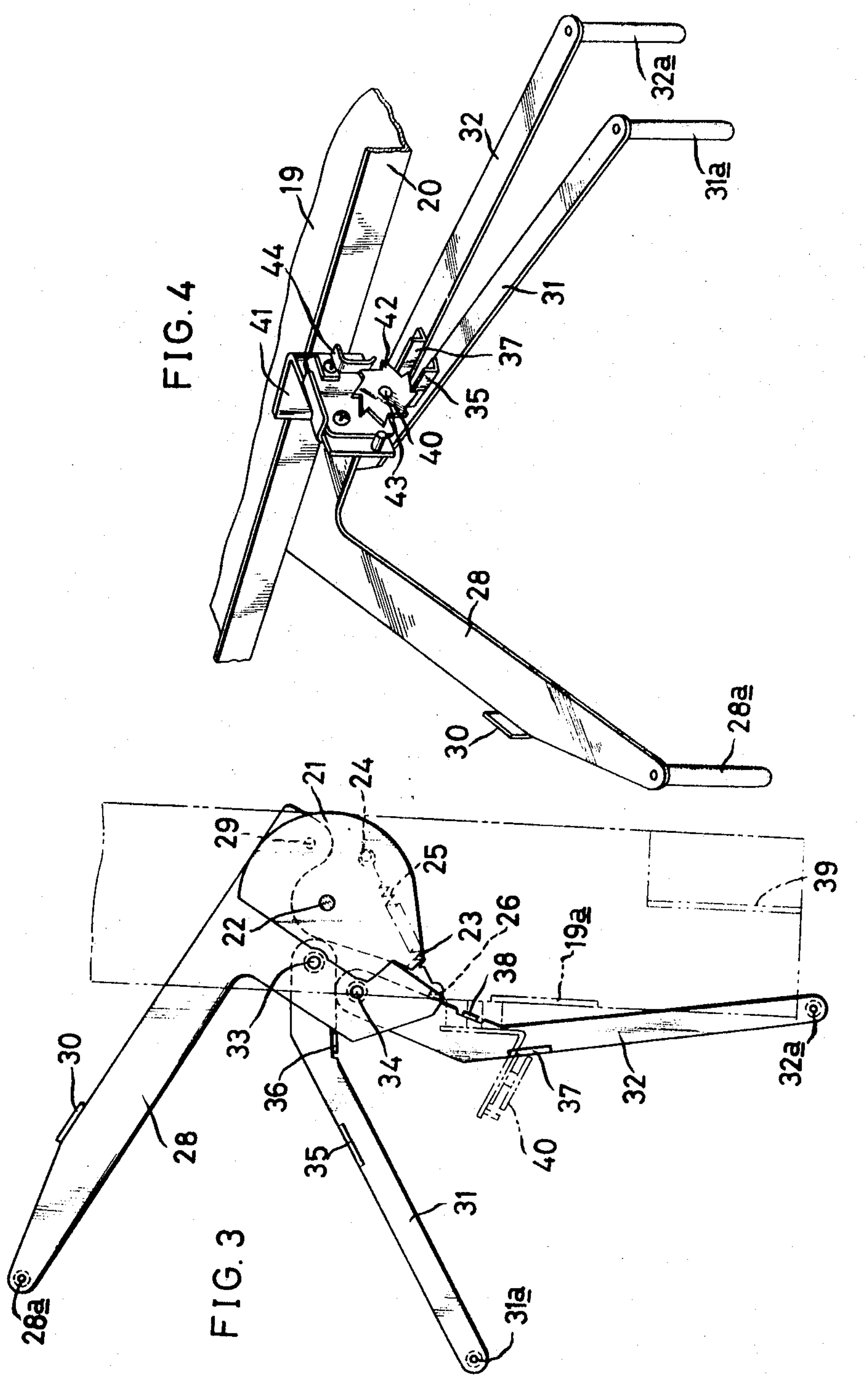
FIG. 3 is a top view showing the position of the fingers after the first and second fingers have passed the ratchet.
FIG. 4 is a perspective view of the fingers and the ratchet and pawl.

Two parallel fingers 31 and 32 are rotatably secured to the leg 27 of the finger 28 by pins 33 and 34 respectively. Each arm has a pair of depending lugs 35, 36 and 37, 38 respectively thereon. An abutment 39 is rigidly secured to the loading plate 19 which limits the rotation of the fingers by functioning as a stop. The abutment 39 in conjunction with the stop 19*a* maintain the fingers in perfect axial alignment with the loading plate 19. Each finger 28, 31 and 32 has a depending tape guide 28*a*, 31*a* and 32*a* respectively thereon which extends at approximately 90° to the finger on which it is mounted, however, any suitable angle can be chosen. The latter guides serve to guide the tape 14 around the drum 17. A ratchet 40 is rotatably mounted on a bracket 41 which is secured to the flange 20 on the loading plate 19. The ratchet includes a toothed wheel 42 as shown in FIG. 4 mounted for rotation on a pin 43. A resilient spring 44 bears frictionally on the ratchet wheel 42 somewhat in the manner of a pawl, however, the spring 44 permits the wheel to slip when sufficient pressure is applied to a tooth of the wheel. In this manner, the spring differs from the positive holding force of a pawl. The lugs 35 and 37 are designed to strike the teeth on the ratchet wheel 40 in their course of rotational movement and each arm 31, and 32 is held by a tooth until it is forced against the frictional bias of the spring 44 to overcome the latter force and thereby rotate the ratchet wheel 40 and free the arm for further rotation. The force to overcome the bias of the spring is supplied by the motor (not shown) which, through a pulley or gear arrangement, drives the plate 21. When the lug 23 on the plate 21 strikes the leg 27, the arm 28 is moved. The leg, during its rotation, strikes the lug 36 on the arm 31 which forces the finger 31 past the restraint of the ratchet wheel 40. Further movement of the leg 27 causes it to strike the lug 38 on the arm 32 and force it past the restraint of the ratchet wheel 40.

Figure 2:
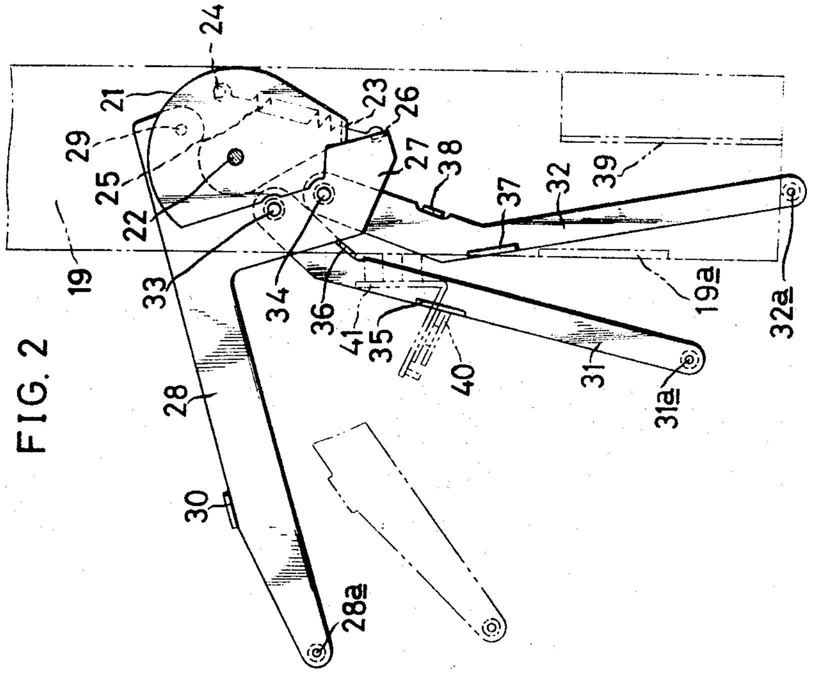
FIG. 2 is a top view showing the position of the fingers after their initial movement.

In actual operation, the tape guides 28*a*, 31*a* and 32*a* are initially behind the tape 14 as in position A,B,C, shown in FIG. 5. The plate 21 is turned by a motor and pulley or gear mechanism. Since the arm 28 is eccentrically mounted on the plate 21, and since the arms 31 and 32 are fixed to the leg 27 on the finger 28, rotation of the plate 21 moves the arms 28, 31 and 32 from the point A, B, C, to the point $A_2$ $B_2$ $C_2$ whereby the tape 14 is withdrawn out of the cassette 11. When the arms are fully withdrawn, the arm 28 begins to rotate as shown in FIG. 2 and the abutment 23 on the plate 21 bears against the leg 27 to promote the rotation of the arm 28. Since the arms 31 and 32 are rotatably connected to the leg 27, they too begin a clockwise rotation as shown in FIG. 2. As shown in FIGS. 2 and 4, the lug 35 on the arm 31 abuts against a tooth on the ratchet wheel 40 which serves to preclude further movement of the arm 31 since the spring 44 resiliently bears on the ratchet wheel 40. The arm 28 continues to move until the leg 27 strikes the lug 36. At this point the arm 31 is forced against the tooth of the ratchet wheel 40 with sufficient force to overcome the frictional bias of the spring 44. There is now a space between the arms 28 and 31 since the arm 28 was moving while the arm 31 was stopped as shown in FIG. 3. The lug 37 on the arm 32 abuts against a tooth on the ratchet wheel 40 in the same manner as the arm 31. The leg 27 meets the lug 38 and forces the arm 32 past the ratchet after the arms 31 and 32 have become sufficiently spatially separated.

Turning now to FIG. 5, the effect of the rotation of the arms 28, 31 and 32 will be explained and shown.

As the arm 28 first begins its clockwise rotation, the tape guide 28*a* pulls the magnetic tape 14 to point $A_3$ forming the tape loop $L_1$. When the arms 28, 31, 32 are at the position $A_4$, $B_4$, $C_4$ and are separated from each other, the loop length $L_2$ is longer than at any other position of its travel. As the arms 28, 31, 32 continue their rotation to the position $A_5$, $B_5$, $C_5$, the loop length $L_3$ is smaller than at $L_2$ whereby the tape is looser because more tape is present for a smaller arm spread. The tape 14 therefore drops from the arms by gravity and encircles the tape guide drum 17.

A series of upright guide posts 45, 46 can be used to maintain the tape oriented properly and a slanted guide post 47 can be used to keep the tape higher on one side of the drum than the other so the tape can be scanned helically by the magnetic heads in the periphery of the drum.

In view of the detailed description included above, the operation of the tape guiding mechanism of the present invention will readily be understood by those skilled in the art. While there has been shown and described a particular embodiment of the present invention, it will be apparent to those skilled in the art that various changes and modifications may be made without departing from the invention in its broader aspects, and it is therefore, contemplated in the appended claims to cover all such changes and modifications as fall within the true spirit and scope of the invention.

What is claimed is:

1. In a tape guiding mechanism for use with a magnetic tape record/playback mechanism having a chassis, a magnetic tape wound on said chassis, at least one magnetic head provided in a tape guide drum on said chassis, and drive means on said chassis to drive the tape, the improvement comprising,
   a. a plurality of arms having tape guiding means thereon,
   b. rotating means secured to said arms for rotating said tape guiding means around said drum,
   c. means for successively spreading apart said arms in response to the rotation of said rotating means, and
   d. means for stopping said arms at their spread apart positions to maintain them spaced from each other.

2. In a tape guiding mechanism for use with a magnetic tape record/playback mechanism having a chassis, a magnetic tape wound on said chassis, at least one magnetic head provided in a tape guide drum on said chassis, and drive means on said chassis to drive the tape, the improvement comprising,
   a. a plurality of arms having tape guiding means thereon,
   b. rotating means including a plate secured to said arms for rotating said tape guiding means around said drum,
   c. stop means on said chassis for separating said arms to maintain them spaced from each other, and
   d. biasing means connected to said plate and one of said arms to bias said arm toward said plate.

3. In a tape guiding mechanism for use with a magnetic tape record/playback mechanism having a chassis, a magnetic tape wound on said chassis, at least one magnetic head provided in a tape guide drum on said chassis, and drive means on said chassis to drive the tape, the improvement comprising,
   a. a plurality of arms having tape guiding means thereon,
   b. rotating means secured to said arms for rotating said tape guiding means around said drum, and
   c. stop means on said chassis for separating said arms to maintain them spaced from each other, and wherein one of said arms is rotatably attached to said rotating means and the other arms are rotatably secured to the arm which is rotatably attached to the rotating means.

4. In a tape guiding mechanism for use with a magnetic tape record/playback mechanism having a chassis, a magnetic tape wound on said chassis, at least one magnetic head provided in a tape guide drum on said chassis, and drive means on said chassis to drive the tape, the improvement comprising,
   a. a plurality of arms having tape guiding means thereon,
   b. rotating means secured to said arms for rotating said tape guiding means around said drum, and
   c. stop means on said chassis for separating said arms to maintain them spaced from each other, and wherein one of said arms is eccentrically secured to said rotating means whereby said arm can move longitudinaloy and can rotate.

5. In a tape guiding mechanism for use with a magnetic tape record/playback mechanism having a chassis, a magnetic tape wound on said chassis, at least one magnetic head provided in a tape guide drum on said chassis, and drive means on said chassis to drive the tape, the improvement comprising,
   a. a plurality of arms having tape guiding means thereon,
   b. rotating means secured to said arms for rotating said tape guiding means around said drum, and
   c. stop means on said chassis for separating said arms to maintain them spaced from each other, said stop means comprising a ratchet wheel having teeth thereon and friction means operatively associated with said ratchet wheel to prevent free rotation of said wheel.

6. In a tape guiding mechanism for use with a magnetic tape record/playback mechanism having a chassis, a magnetic tape wound on said chassis, at least one magnetic head provided in a tape guide drum on said chassis, and drive means on said chassis to drive the tape, the improvement comprising,
   a. a plurality of arms having tape guiding means thereon,
   b. rotating means secured to said arms for rotating said tape guiding means around said drum, and
   c. stop means on said chassis for separating said arms to maintain them spaced from each other, and in which all but one of said arms has means thereon adapted to be engaged by said stop means.

7. A tape guiding mechanism as defined in claim 6 wherein said means comprises upstanding lugs which abut against said stop means when said arms rotated.

8. A tape guiding mechanism for use with a video tape recorder comprising,
   a. a plate rotatably mounted on the chassis of said tape recorder,
   b. an arm having an "L"-shaped portion rotatably secured to said plate by one of the "L"-shaped legs,
   c. at least one other arm rotatably secured to the other of said "L"-shaped legs,
   d. abutment means on said plate for abutting against said other leg,
   e. stop means on said chassis adapted to stop the rotation of said other arm,
   f. abutment means on said other arm adjacent said other "L"-shaped leg wherein said other leg against said abutment means on said other arm and overcomes said stop means.

9. A tape guiding mechanism as defined in claim 8 wherein said arm having an "L"-shaped portion is eccentrically located on said plate.

10. A tape guiding mechanism as defined in claim 8 further comprising spring means connected to said plate and to one of said arm having the "L"-shaped portion to bias said leg towards said plate.

* * * * *